United States Patent

Watson

[15] 3,681,611
[45] Aug. 1, 1972

[54] VEHICULAR REMOTE POWER SUPPLY SYSTEM

[72] Inventor: Fred A. Watson, Boise, Idaho

[73] Assignee: Soltronics, Inc., Boise, Idaho

[22] Filed: May 26, 1971

[21] Appl. No.: 146,992

Related U.S. Application Data

[63] Continuation-in-part of Ser. No. 91,316, Nov. 20, 1970, Pat. No. 3,614,459.

[52] U.S. Cl. .................................. 307/10 R, 307/66
[51] Int. Cl. .............................................. H02g 3/00
[58] Field of Search ..... 307/10 R, 10 BP, 66; 320/32; 290/1

[56] References Cited

UNITED STATES PATENTS 3,293,443  12/1966  Burch.......................... 307/10 R

*Primary Examiner*—Robert K. Schaefer
*Assistant Examiner*—William J. Smith
*Attorney*—Christel & Bean

[57] ABSTRACT

A vehicular remote power supply including a main relay connected to the field terminal of the vehicle generator which relay operates, in response to connection of a remote load to the power supply, to disconnect the generator field terminal from the vehicle regulator and to connect the generator field terminal with the vehicle battery. The relay also operates to cause energization of a solenoid which, in turn, moves a plunger to advance the engine throttle thereby increasing engine speed. When the throttle has advanced a predetermined distance, it operates a protective switch which disconnects the generator from the battery. The remote load can be a hand tool or similar appliance, a storage battery to be charged, or a welding electrode, in which latter case the system includes timing means and renders the generator self-excited.

14 Claims, 1 Drawing Figure

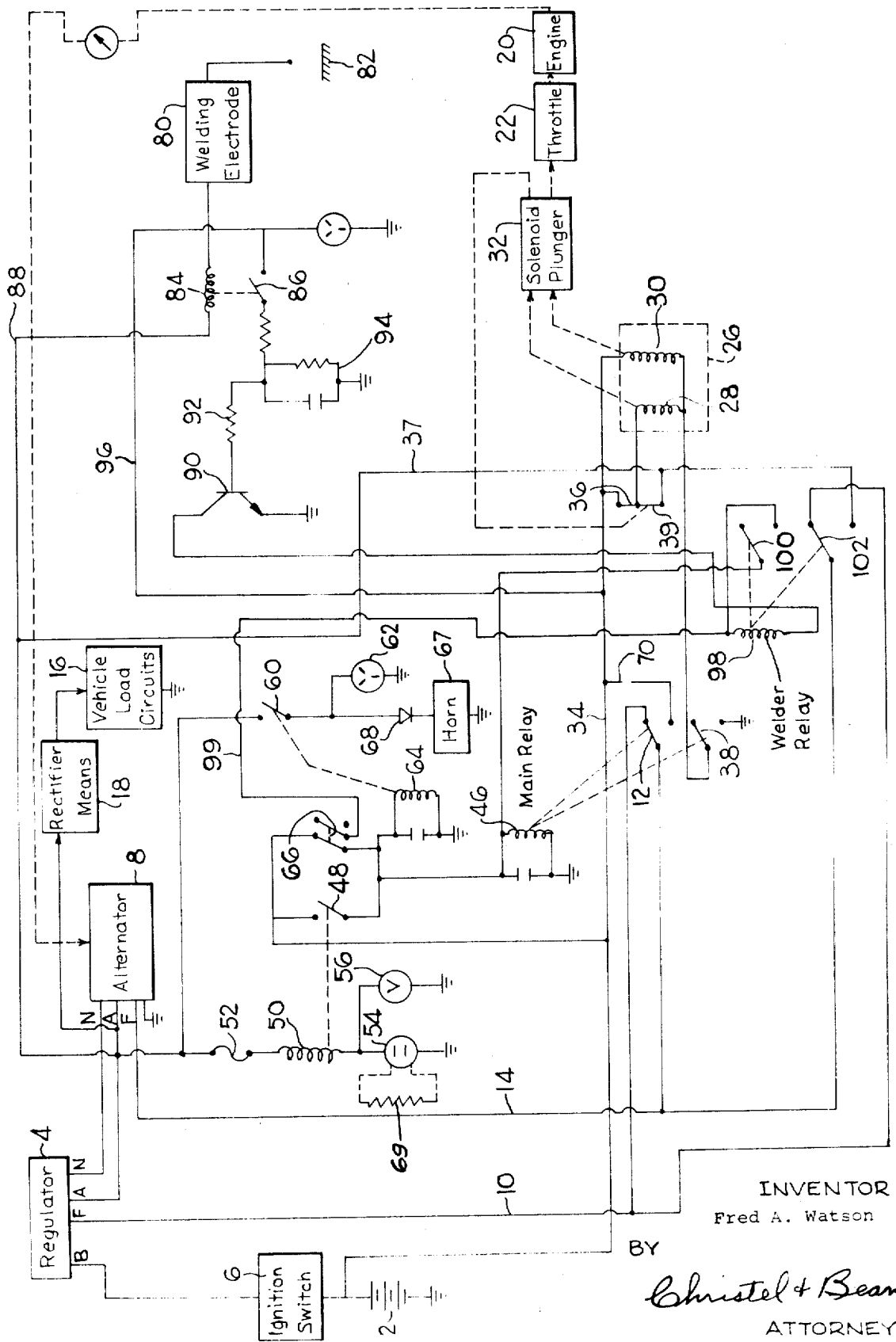

VEHICULAR REMOTE POWER SUPPLY SYSTEM

CROSS REFERENCE TO A RELATED APPLICATION

This invention is a continuation-in-part of my co-pending application, Ser. No. 91,316, now U.S. Pat. No. 3,614,459 filed Nov. 20, 1970 and entitled "Vehicular Remote Power Supply System".

BACKGROUND OF THE INVENTION

The present invention relates to a power supply for operating a remote load from the electrical system of a vehicle and, more particularly, to a new and improved vehicular remote power supply which automatically provides isolation and overload protection for the vehicle electrical system.

Various types of remote or emergency power supply systems operable from the conventional electrical system of an automotive vehicle have been proposed in the patented prior art. In the patents to Burch U.S. Pat. No. 3,293,443, Schneider U.S. Pat. Nos. 3,456,119 and 3,471,706 and Chilton et al. No. 3,497,709, various types of vehicular power supply systems are disclosed for operating power hand tools or accessories, for charging storage batteries, or for converting, inverting or varying the magnitude of the voltage produced by the dynamo of the vehicle. As shown in the patents to Brown U.S. Pat. No. 1,528,364, McEniry U.S. Pat. No. 2,182,030 and Anderson U.S. Pat. No. 2,976,424, it has been proposed to supply electrical power from the vehicle electrical system to welding electrode means, use being made of solenoid means to advance the throttle to increase the engine speed and thereby drive the dynamo at a higher generating speed.

In general, the known auxiliary vehicle power supply systems require closure of a manual switch to initiate system operation. This switch usually is operable to break the electrical connection between the output post of the dynamo and the vehicle battery, thereby permitting the dynamo output voltage to be elevated to the desired voltage by appropriate regulation of the speed of the dynamo. One hazard presented by such a system is that excessive current can flow and cause damage to the dynamo and associated components such as rectifier diodes in the event that the switch is left in the operating position without an electrical load being placed across the dynamo.

Another disadvantage of several of the prior semi-automatic vehicular power supply systems is that some type of vacuum-operable means are commonly used to advance the throttle. These types of systems are expensive to install, and a small leak in the vacuum line will render them totally inoperable. A further drawback of the known system is the requirement for provision of a fuse in one side of the high voltage circuit to prevent overloading of the dynamo, thereby eliminating the dynamo from use as a source of power for a maximum amperage welder or battery charger.

SUMMARY OF THE INVENTION

It would, therefore, be highly desirable to provide a new and improved vehicular remote power supply system which is operable automatically to increase the vehicle generator speed for generating a high d.c. output voltage and which automatically provides isolation and overload protection for the vehicle electrical system. Furthermore, the system desirably will be placed in operation only in response to connection of the remote load. It also would be desirable to provide such a system for use as a manually operable battery charger which gives an alarm when the battery-charging cables are connected with the wrong polarity. In addition, it would be advantageous to provide with such a system an automatic welding apparatus including time-delayed operation and self-excitation of the vehicle generator.

The present invention provides a vehicular remote power supply system which operates, in response to connection of a remote load thereto, to isolate the vehicle regulator from the field terminal of the vehicle generator and to apply a suitable excitation voltage to the generator field terminal. The system then operates to increase the speed of the vehicle engine and, therefore, to drive the generator at an increased speed to provide a high d.c. output voltage. When the engine speed has been increased by a predetermined amount, the generator armature terminal is isolated from the vehicle d.c. voltage source or battery. The remote load can comprise a battery to be charged, in which case the system provides an alarm signal when the battery cables are connected improperly. When the remote load comprises welding electrode means, the power supply system begins operation a predetermined time after engagement between the welding electrode and a workpiece. In addition, the generator field terminal is disconnected from the regulator field terminal and connected to the generator armature terminal whereby the generator is electrically self-excited.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

BRIEF DESCRIPTION OF THE DRAWING FIGURE

The single FIGURE of the drawing is a schematic diagram of a vehicular remote power supply system according to the present invention.

DETAILED DESCRIPTION OF THE PREFERRED EMBODIMENT

Referring now to the drawing, the conventional vehicle d.c. voltage source or battery 2 is connected with the battery terminal B of the regulator 4 via the ignition switch 6. The regulator includes also armature and neutral terminals A and N that are directly connected with the corresponding terminals of the conventional vehicle generator in the form of alternator 8, and a field terminal F that is normally connected with the alternator field terminal via conductor 10, a two-position first field switch 12, and conductor 14. The armature terminal of the alternator supplies power to the vehicle load circuits 16 via rectifier means 18 arranged either within or separate from the alternator. The alternator 8 is driven by the internal combustion engine 20, the speed of operation of which is controlled by the throttle means 22. For purposes of convenience, the term generator is used herein to refer to both the commonly known d.c. type generator and the a.c. type generator, the latter being commonly referred to as an alternator. In the vehicle electrical system of the present illustration, alternator 8 is assumed to include built-in rectifier means for convenience in describing the power supply circuit of the present invention.

In accordance with the present invention, means responsive to a demand for high voltage power are automatically operable to short out the regulator field control of the alternator and to increase the operating speed of the engine, thereby to drive the alternator at a higher generating speed. More particularly, there is provided electromechanical means comprising solenoid means 26 including a pull-in coil 28, a hold-in coil 30 and a solenoid plunger 32 for operating the throttle control 22 to increase the engine drive speed. Plunger 32 is suitably mechanically connected to throttle means 22. Power is supplied to one end of the solenoid pull-in coil 28 from battery 2 via conductor 34 and a normally closed three-pole protective switching means including pull-in switch 36, and the other end of the pull-in coil 28 is connected with ground via the normally open ground switch 38. The alternator armature terminal A is connected with the d-c voltage source via conductor 37 and armature switch 39, which comprises another pole of the protective switching means. The protective switching means is suitably mechanically connected to plunger 32 whereby switches 36 and 39 are opened when throttle 22 has been moved by plunger 32 through a predetermined distance.

The apparatus of the present invention further comprises electrically operated switching means, selectively connected by energizing means to d.c. voltage source 2, operable when energized to disconnect the field terminal of alternator 8 from the field terminal of regulator 4 and to connect the alternator field terminal to d.c. source 2. In particular, the first field switch 12 and the ground switch 38 are operable by a normally de-energized main relay 46 that is connected with the d-c voltage source 2 via a normally open Reed switch 48. Switch 48 is operable by a current responsive means in the form of actuating coil 50 that is connected at one end with the armature terminal of alternator 8 via fuse 52. The other end of actuating coil 50 is connected with electrical ground when a remote load designated 69 is connected to outlet receptacle 54. Voltmeter means 56 are provided for reading the high direct-current output voltage appearing at the receptacle 54. By virtue of this arrangement, the electrically operated switching means is energized only when a load of sufficient magnitude is connected to receptacle 54, thereby protecting against the hazard of excessive current flow.

The apparatus of the present invention also can supply a relatively high d.c. voltage for charging a storage battery. To this end, the armature terminal of alternator 8 is connected through a normally open, isolation or battery charging switch 60 to one terminal of a battery charging outlet receptacle 62, the other terminal of which is connected to electrical ground. Switch 60 is closed in response to energization of a coil 64 which, in turn, is connected through a manually operated d.p.d.t switch 66 to d.c. voltage source 2. An alarm 67 and forward current diode 68 are connected across outlet receptacle 62 to provide an audible alarm if the battery cables are connected with the wrong polarity.

When switch 60 is closed, the battery properly connected to receptacle 62 is connected to the positive side of the charging alternator 8, and the number of battery cells being charged determines the charging voltage. Switch 60 is closed, however, only in response to manual operation of switch 66 because of the potential dangers associated with battery charging, such as ignitable gas which can be present around a battery and damage resulting from wrong polarity connections.

The apparatus of the present invention described thus far operates in the following manner. With the vehicle engine idling, when a remote load 69 of predetermined magnitude, such as a minimum of 100 watts, is plugged into receptacle 54, current flows through coil 50 closing switch 48 and energizing relay 46 from d.c. voltage source 2. Load 69 can be a hand tool or similar appliance requiring a d.c. voltage of about 110 volts. Alternatively, a battery to be charged is connected through cables to receptacle 62 and switch 66 is placed in the battery charging position as shown in the drawing. Relay 46 is energized from d.c. source 2 along with coil 64 which, in turn, closes switch 60 to connect the armature terminal of alternator 8 to the battery to be charged.

In either case the electrically operated switching means comprising relay 46 is energized from d.c. voltage source 2 in response to connection of a remote load. When main relay 46 is energized, it closes ground switch 38 to energize solenoid pull-in coil 28, and first field switch 12 is operated to the second position to isolate the regulator field terminal and to connect the alternator field terminal directly with the d-c cource 2 via conductor 14, switch 12, and conductors 70 and 34. Owing to the energization of pull-in coil 28, solenoid plunger 32 is displaced from its de-energized position toward its fully energized position, thereby advancing the throttle 22 to increase engine driving speed and, consequently, to increase the speed at which the alternator 8 is driven. When the solenoid plunger reaches the fully energized position, pull-in switch 36 and armature switch 39 are opened by the plunger, thereby de-energizing the pull-in coil 26 and isolating the alternator armature terminal from the d-c voltage source. The solenoid plunger is now maintained in the fully energized position by the hold-in coil 30 that is energized by d.c. voltage source 2 through conductor 34 and switch 38. Alternator 8 therefore is driven at a relatively high speed to supply a relatively high rectified d.c. voltage to a load connected to receptacle 54 or to a storage battery connected to receptacle 62 for charging the battery. The armature terminal of alternator 8 is isolated from the d.c. source 2 automatically when the high speed operation is attained.

In accordance with another significant feature of the invention, a welding electrode 80 is provided for engagement with a workpiece 82, the welding electrode being connected with the armature terminal of alternator 8 through a timing coil 84 and a conductor 88. At the start, switch 66 is moved to the other position, opposite that shown in the drawing, which corresponds to welding. When welding electrode 80 is brought into engagement with the workpiece 82, timing coil 84 is energized to effect closure of the normally open timing switch 86, whereupon the control electrode of the normally non*onductive transistor* 90 is connected with the d-c voltage source 2 through a bleeder resistor 92, an r-c timing circuit 94, switch 86 and a conductor 96. When transistor 90 conducts, welder relay 98 is energized from d.c. voltage source 2 through switch 66 and a conductor 99. This, in turn, operates the welder switch 100 to connect the main relay 46 with the d-c source 2, and operates the two-position second field switch 102 to isolate the regulator field terminal by disconnecting it from the alternator field terminal and to connect the alternator field terminal with the alternator armature terminal by means of conductor 14, switch 102, and conductor 37. Alternator 8 now is connected in an electrically self-excited condition. Energization of relay 46 operates switch 46 as in the foregoing operation to disconnect the field terminal of alternator 8 from the field terminal of regulator 4 and to convert the alternator field terminal with d.c. source 2. Energization of relay 46 also closes ground switch 38 to energize solenoid means 26 and move plunger 32 to operate engine 20 at a high driving speed, whereupon alternator 8 is driven to supply the high welding voltage to the welding electrode means. When plunger 32 reaches the fully energized position, the armature switch 39 is opened to isolate the alternator armature terminal from the d-c voltage source 2, and the switch 36 is opened to de-energize the pull-in coil 28. The position of plunger 32 is maintained by coil 30.

When the welding process is initiated, the striking voltage is lowered to about 20 volts by the load placed on it, thereby raising the current flow through the self-excited alternator 8. The delay system is provided since a prolonged voltage of more than 30 volts would be harmful to the field of alternator 8, and further to assist in the striking of the welding arc. The welding relay 98 stays closed until the capacitor in the delay network 94 is discharged, the time normally being about 3 seconds as determined by bleeder resistor.

Preferably the solenoid plunger 32 is connected with throttle 22 by means of a motorcycle-type cable with screw adjustments at both ends, whereby the speed of alternator 8 may be regulated to make it a low or high output charger. In the case of a high d.c. power unit, one thereby has the ability to set the voltage as desired.

It is important to note that while the high d-c power supply and welding systems are fully automatic, the battery charging system is intentionally designed for manual operation, as previously mentioned, because of the danger of an arc igniting the hydrogen that is formed around a battery, and because of the damage that results from connecting a battery with the wrong polarity.

I claim:

1. A vehicular remote power supply adapted for use with a vehicle electrical system including a d.c. voltage source; a generator having armature and field terminals for producing a d.c. output voltage; a regulator having a field terminal, a battery terminal connected to said voltage source, and an armature terminal connected to said generator armature terminal; said generator being driven by the internal combustion engine of the vehicle controlled by throttle means; said remote power supply comprising:

a. means for connecting said generator armature terminal to a load having a relatively high d.c. voltage requirement;
 b. electrically operated switching means normally connecting said generator field terminal to said regulator field terminal and operable when electrically energized to disconnect said generator field terminal from said regulator field terminal and to connect said generator field terminal to said d.c. voltage source;
 c. energizing means for selectively connecting said d.c. voltage source to said switching means for causing operation thereof; and
 d. protective switching means operable to disconnect said generator armature terminal from said d.c. voltage source after said throttle means has been advanced through a predetermined distance.

2. Apparatus according to claim 1 further including electromechanical means mechanically connected to said throttle means and electrically coupled by said electrically operated switching means to said d.c. voltage source for moving said throttle means to increase engine speed when said electro-mechanical means is energized by said d.c. voltage source.

3. Apparatus according to claim 2 wherein said protective switching means is mechanically coupled to said electromechanical means and normally connects said generator armature terminal to said d.c. voltage source and operates to disconnect said generator armature terminal from said d.c. voltage source when said electromechanical means has advanced said throttle means through a predetermined distance.

4. Apparatus according to claim 3 wherein said protective switching means also normally connects said d.c. voltage source to said electromechanical means and disconnects said d.c. source from said electromechanical means also when said throttle means has been moved through said predetermined distance, and wherein said electromechanical means includes holding circuit means connected to said d.c. voltage source by said electrically operated switching means when the latter is operated.

5. Apparatus according to claim 1 wherein said load-connecting means includes current responsive means and wherein said energizing means is connected in controlled relation to said current responsive means whereby said energizing means connects said d.c. voltage source to said electrically operated switching means only when a load is connected to said generator armature terminal.

6. Apparatus according to claim 1 wherein the load is a battery to be charged having opposite polarity terminals, wherein said energizing means includes manually operated switching means for connecting said d.c. voltage source to said electrically operated switching means, and wherein said load connecting means includes isolation switch means connected in controlled relation to said energizing means for connecting said battery to be charged to said generator armature terminal when said electrically operate switching means is energized.

7. Apparatus according to claim 6 further including alarm means connected to said load connecting means for indicating an improper polarity connection of said battery terminals relative to said generator armature terminal.

8. Apparatus according to claim 1 wherein the load comprises welding electrode means adapted to be brought into engagement with a workpiece, wherein said load-connecting means includes means responsive to engagement of said welding electrode means with said workpiece, wherein said energizing means is connected in controlled relation to said engagement responsive meanS whereby said electrically operated switching means is operated when said welding electrode means is in engagement with said workpiece, and wherein said apparatus further comprises switching means connected in controlled relation to said energizing means and normally connecting said generator field terminal to said regulator field terminal and operated by said energizing means to disconnect said generator field terminal from said regulator field terminal and to connect said generator field terminal to said generator armature terminal whereby said generator is electrically self-excited.

9. Apparatus according to claim 8 wherein said energizing means includes time delay means for operating said electrically operated switching means only a predetermined time after engagement between said welding electrode means and said workpiece.

10. Apparatus according to claim 1 wherein said electrically operated switching means comprises relay means having a control coil connected between said energizing means and electrical ground, a first switching means connecting said generator field terminal to either said regulator field terminal or said d.c. voltage source depending upon the electrical condition of said coil, and a second switching means electrically connecting said electromechanical means to said d.c. voltage source when said coil is energized.

11. Apparatus according to claim 2 wherein said electro-mechanical means comprises solenoid means having a coil connected between said d.c. source and said electrically operated switching means in a manner so as to be energized when said switching means is operated and a plunger mechanically connected to said throttle means for moving said throttle means in response to energization of said coil.

12. Apparatus according to claim 10 wherein said energizing means includes normally open reed switch means for connecting said d.c. source to said coil of said electrically operated switching means, said reed switch means having a control coil connected in series with said load-connecting means whereby said d.c. voltage source is connected to said coil of said electrically operated switching means only when a load is connected to said generator armature terminal.

13. Apparatus according to claim 11 wherein said electromechanical means further includes a holding coil connected to said d.c. voltage source by said electrically operated switching means when the latter is operated so as to maintain said plunger in a given position when said solenoid coil is de-energized, and wherein said protective switching means is operatively connected to said plunger and also normally connects said d.c. voltage source to said solenoid coil and disconnects said coil when said plunger has moved said throttle means through said predetermined distance.

14. Apparatus according to claim 1 wherein the load comprises welding electrode means adapted to be brought into engagement with a workpiece and wherein said energizing means comprises:
   a. first relay means including a coil and having a first position wherein said electrically operated switching means is disconnected from said d.c. voltage source and said generator field terminal is connected to said regulator field terminal and operable in response to a flow of current through said coil to a second position connecting said d.c. voltage source to said electrically operated switching means and connecting said generator field terminal to said generator armature terminal whereby said generator is electrically self-excited;
   b. means connecting one terminal of said coil to said d.c. voltage source;
   c. semiconductor switching means having a control terminal and connected to the other terminal of said coil in a manner such that when said semiconductor means is rendered conducting current flows through said relay coil;
   d. an R-C timing circuit connected to said semiconductor means control terminal whereby said semiconductor means is switched into a conducting state a predetermined time delay after a voltage of sufficient magnitude is applied to said timing circuit; and
   e. a second relay means having a coil and operable to connect a voltage of said sufficient magnitude to said timing circuit in response to energization of said coil, said coil being connected to said load connecting means in a manner whereby said coil is energized in response to engagement of said welding electrode means with said workpiece.

* * * * *

UNITED STATES PATENT OFFICE
CERTIFICATE OF CORRECTION

Patent No. 3,681,611         Dated August 1, 1972

Inventor(s) Fred A. Watson

It is certified that error appears in the above-identified patent and that said Letters Patent are hereby corrected as shown below:

The assignee named in the heading of the patent should be Oxytronics, Inc., Buffalo, New York, instead of Soltronics, Inc., Boise, Idaho.

Signed and sealed this 3rd day of April 1973.

(SEAL)
Attest:

EDWARD M. FLETCHER, JR.        ROBERT GOTTSCHALK
Attesting Officer              Commissioner of Patents